US012187981B2

(12) United States Patent
Piorkowski

(10) Patent No.: US 12,187,981 B2
(45) Date of Patent: Jan. 7, 2025

(54) DISSOLVABLE TOILET BRUSH FORMULATIONS WITH DESICCANT AND DYE SYSTEM TO INDICATE CLEANING

(71) Applicant: Henkel AG & Co. KGaA, Düsseldorf (DE)

(72) Inventor: Daniel Thomas Piorkowski, Fairfield, CT (US)

(73) Assignee: HENKEL AG & CO. KGAA, Düsseldorf (DE)

( * ) Notice: Subject to any disclaimer, the term of this patent is extended or adjusted under 35 U.S.C. 154(b) by 336 days.

(21) Appl. No.: 17/897,039

(22) Filed: Aug. 26, 2022

(65) Prior Publication Data

US 2024/0067898 A1 Feb. 29, 2024

(51) Int. Cl.

| | |
|---|---|
| ***C11D 1/00*** | (2006.01) |
| ***C11D 1/14*** | (2006.01) |
| ***C11D 3/08*** | (2006.01) |
| ***C11D 3/10*** | (2006.01) |
| ***C11D 3/20*** | (2006.01) |
| ***C11D 3/40*** | (2006.01) |
| ***C11D 17/00*** | (2006.01) |

(52) U.S. Cl.
CPC ................ *C11D 1/143* (2013.01); *C11D 3/08* (2013.01); *C11D 3/10* (2013.01); *C11D 3/2086* (2013.01); *C11D 3/40* (2013.01); *C11D 17/0056* (2013.01); *C11D 2111/14* (2024.01)

(58) Field of Classification Search
None
See application file for complete search history.

(56) References Cited

U.S. PATENT DOCUMENTS

| | | | | |
|---|---|---|---|---|
| 2,755,497 | A | 7/1956 | Greacen, Jr. | |
| 4,031,673 | A | 6/1977 | Hagelberg | |
| 4,167,422 | A * | 9/1979 | Bellanca | C09B 69/10 524/556 |
| 4,493,124 | A | 1/1985 | Agapiou | |
| 4,642,836 | A | 2/1987 | Bokmiller | |
| 4,852,201 | A | 8/1989 | Wundrock et al. | |

(Continued)

FOREIGN PATENT DOCUMENTS

| | | | |
|---|---|---|---|
| DE | 102008028138 | A1 | 12/2009 |
| EP | 1553864 | A2 | 7/2005 |

(Continued)

OTHER PUBLICATIONS

Co-pending U.S. Appl. No. 17/301,837, inventors Larracuente, A., et al., filed on Apr. 15, 2021 (Not yet Published).

*Primary Examiner* — Necholus Ogden, Jr.
(74) *Attorney, Agent, or Firm* — Blank Rome LLP

(57) ABSTRACT

A dissolvable unit dose toilet cleaning composition for use with a wand. The unit dose contains surfactant, an organic acid, an organic acid buffering agent, and a dye system including a desiccant, a water-soluble dye, and optionally a colorant. The composition is compressed into a tablet or puck wherein at least 30% dissolves in 10 minutes when submerged in toilet water. Upon exposing a surface of the unit dose composition to water in the toilet, the water-soluble dye colors the water in the toilet. Pressing the wetted surface of the unit dose composition to a surface of the toilet, the water-soluble dye colors the surface of the toilet.

20 Claims, 5 Drawing Sheets
(2 of 5 Drawing Sheet(s) Filed in Color)

(56) References Cited

U.S. PATENT DOCUMENTS

| | | | |
|---|---|---|---|
| 5,471,697 | A | 12/1995 | Daconta |
| 5,630,243 | A | 5/1997 | Federico et al. |
| 5,888,002 | A | 3/1999 | Fenstersheib |
| 6,094,771 | A | 8/2000 | Egolf et al. |
| 6,124,251 | A | 9/2000 | Rader et al. |
| 6,463,620 | B2 | 10/2002 | Busha |
| 6,863,830 | B1 | 3/2005 | Purdy et al. |
| 6,939,841 | B2 | 9/2005 | Requejo |
| 7,065,825 | B2 | 6/2006 | Minkler et al. |
| 7,127,768 | B2 | 10/2006 | Blum et al. |
| 7,146,676 | B2 | 12/2006 | Kubes et al. |
| 7,159,265 | B2 | 1/2007 | Soller et al. |
| 7,232,364 | B2 | 6/2007 | Hibbard |
| 7,275,276 | B2 | 10/2007 | Jaszenovics et al. |
| 7,530,138 | B1 | 5/2009 | Platt |
| 7,563,756 | B2 | 7/2009 | Brady |
| 7,650,663 | B2 | 1/2010 | Michaels et al. |
| 7,827,648 | B2 | 11/2010 | Soller et al. |
| 9,408,521 | B2 | 8/2016 | Molinet et al. |
| 2002/0061831 | A1 | 5/2002 | Kaziska et al. |
| 2003/0040459 | A1* | 2/2003 | Araya .................... C11D 3/124 510/507 |
| 2007/0079460 | A1 | 4/2007 | Tapp et al. |
| 2010/0125957 | A1* | 5/2010 | Hong ................... C11D 3/3707 8/647 |
| 2012/0246854 | A1 | 10/2012 | Uchiyama et al. |
| 2013/0104304 | A1 | 5/2013 | Wilson et al. |
| 2016/0106274 | A1 | 4/2016 | Eun |
| 2018/0296043 | A1 | 10/2018 | Meier et al. |
| 2021/0052117 | A1* | 2/2021 | O'Brien ................. A47K 11/10 |

FOREIGN PATENT DOCUMENTS

| | | | | |
|---|---|---|---|---|
| EP | 2569487 | A1 | 3/2013 | |
| ES | 2622227 | T3 | 7/2017 | |
| GB | 738299 | A | 10/1955 | |
| GB | 2242130 | A | 9/1991 | |
| GB | 2329325 | A | 3/1999 | |
| WO | 0149818 | A1 | 7/2001 | |
| WO | WO-2005061689 | A1 * | 7/2005 | ......... C11D 17/0073 |
| WO | 2007107750 | A1 | 9/2007 | |
| WO | 2014039356 | A1 | 3/2014 | |

* cited by examiner

DISSOLVABLE TOILET BRUSH FORMULATIONS WITH DESICCANT AND DYE SYSTEM TO INDICATE CLEANING

FIELD OF THE INVENTION

The present invention is in the field of household and industrial cleaning in applications for cleaning toilets. The present invention relates to dissolvable unit dose formulations that can be used with a wand for manually cleaning toilets and a method for indicating application of such unit dose compositions to a toilet surface.

BACKGROUND OF THE INVENTION

Toilet brushes are typically used to swirl cleaning chemicals around a toilet bowl and then to scrub the sides of the bowl with those chemicals and water, so as to assist in removing stains along the bowl sides. After using such brushes, a consumer will typically attempt to rinse off the brush by swirling it in the bowl water. However, cleaning chemicals, feces, urine, and stray bits of paper typically found in the toilet can be retained on the brush or in its holder.

Numerous mechanical devices have been proposed to overcome disadvantages of a toilet brush having a permanently affixed head. Several commercially available products include a removable head that must be thrown away in the trash. For instance, US Patent Application Publication No. 2016/0106274 discloses a non-woven cleaning fabric layer comprising a cleaning composition, and a functional non-woven fabric layer comprising a functional composition. The cleaning composition comprises an anionic surfactant, an ethanolamine-based compound, a pigment, a dye, or a mixture thereof, and a solvent.

GB 738,299 discloses a toilet cleaning device where the head is slipped into a swab and a toilet is then cleaned by wiping the swab around the surface of the bowl of the toilet. Removal of the swab is achieved by shouldering the swab against the rim of a toilet bowl and pulling the holder away to cause the swab to slip off, into the bowl, and dissolve prior to being flushed away. Other flushable and replaceable brush head elements are disclosed in e.g., U.S. Pat. Nos. 2,755,497, 4,031,673, 5,630,243, and 6,094,771 and GB 2,329,325.

U.S. Pat. No. 7,650,663 discloses flushable heads that are insertable in a permanent type of wand. The brush head may be a stack of sheets of water-dissolvable material. The sheets are compressed to bind them together into a stack. Surface indentations and piercing of layers at the indentations are used to bind the brush head layers together securely without the need for binding adhesives, and to facilitate clamping. The heads releasable from the wand and are said to break up and behave like toilet paper, so they are flushable after use.

However, flushable heads, such as those disclosed in U.S. Pat. No. 7,650,663 are water degradable, as opposed to dissolvable. Thus, oftentimes consumers will opt to discard these heads in their garbage for fear of clogging their toilets as flushable heads take longer to break up and/or have the tendency to degrade incompletely.

Water solubility (as opposed to degradability) is a desirable feature for a toilet cleaning "brush" because it allows the head to be flushed immediately after use, thereby avoiding the need to transport the dripping head to a garbage can, and avoiding any odors that may develop if the brush head were left in a garbage can for some time period after use. It also avoids the potential for clogging that can occur when ingredients of a pad dissolve incompletely and/or take a long time to break up.

U.S. Pat. No. 5,471,697 discloses a toilet cleaning device that has a cleaning head in the shape of a foot. This head is able to clean underneath the rim of the toilet. However, a user has to continually rotate the device as they clean underneath the rim which involves two hands. This is inconvenient and it also causes one of the hands to be closer to the bowl which may have germs. The disposable feet are made from enzyme-coated biodegradable polymer particles, acrylic polymers, vinyl polymers or copolymers containing acid groups, sodium propionate or polyethylene glycol, thus, they are expensive and may take considerable time to dissolve. Furthermore, in order to remove the head from the shaft, the shaft has to be left in the toilet bowl while the head dissolves. This renders the toilet unusable during that period.

WO 2014/039356A1 discloses dissolvable unit doses with an applicator for cleaning toilets but provides no details on a suitable cleaning formulation for the dissolvable unit dose.

There is a need for improved dissolvable toilet "brush" head formulations. In particular, there is a need for indicating to a user where and when these compositions have been applied.

It is an object of the invention to provide a dissolvable toilet brush product that has a good dissolution rate, a strong structural integrity (so it does not crack during shipment or while in use), provides good foaming (an indication of cleaning efficacy), and is resistant to significant humidity abuse while also providing a visual indicator of application and cleaning to a user.

SUMMARY OF THE INVENTION

The foregoing is achieved by provision of dissolvable solid unit dose formulations e.g., compressed tablets, containing a cleaning composition and a dye system that provides a visual indicator of when the cleaning composition has been applied to a cleaning surface. The unit doses can be used with a wand apparatus to clean a surface. When the composition is dipped into water and applied to a cleaning surface, the dye system provides a visual indicator of where on the cleaning surface the cleaning composition has been applied. The unit doses can be removably attached to the cleaning wand and flushed/washed down a drain after use. The dissolvable formulations alleviate fear of flushing solid material and enables the consumer to clean the toilet, visually see where the cleaning composition has been applied to the toilet surface, and see the solid dissolve during/after use.

The dye system of the invention contains a water-soluble dye in combination with a desiccant and, optionally, a colorant. Including a desiccant and a water-activated dye in a cleaning composition enables an improved product which can provide a visual indicator of cleaning when submerged in water. Prior to inclusion of desiccant, water-soluble dyes contained in the cleaning composition would lightly color the cleaning composition powder but would not color the toilet surface or toilet water as the unit dose was being used.

In some embodiments, the dye system consists of a desiccant and a water-soluble dye, and the cleaning composition and the unit dose composition is free of any other dye or a colorant. In other embodiments, a dye system consisting of desiccant, water-soluble dye, and a colorant can be used to color the unit dose composition while it is stored and the system is able to color the toilet surface and toilet water when the unit dose is used for cleaning. In some of those embodiments, the colorant is a lake pigment.

The amount of water-soluble dye can range from about 0.005% to about 0.1%, more preferably about 0.01% to about 0.05% by weight of the unit dose composition. In certain embodiments, the water-soluble dye is an anionic dye. In certain of those embodiments, the anionic dye is Acid Blue/triphenylmethane.

The desiccant component may be any suitable desiccant. Suitable desiccants include compounds which absorb water and compounds which reversibly bond with water. To qualify as a desiccant, the compound must have sufficient affinity for water to render it capable of absorbing moisture from the surrounding atmosphere. Suitable desiccants include anhydrous salts which absorb water or moisture and form a stable hydrated salt. Other suitable desiccants include capillary desiccants which rely on fine capillaries between adjacent desiccant particles to absorb moisture. In certain preferred embodiments, the desiccant comprises or consist of precipitated calcium silicate. In certain embodiments, the desiccant is/consists of powdered material.

Desiccant may be included from about 0.2% to about 3% by weight of the unit dose composition. More preferably, desiccant is about 0.5% to about 2.0% by weight, most preferably about 0.5% to about 1.5% by weight of the unit dose composition.

Many cleaning compositions can be used with the dye system but the compositions will minimally contain an anionic surfactant, organic acid and an organic acid buffering agent in amounts sufficient to dissolve at least 30% by weight of the unit dose within 10 minutes when submerged without agitation in water. Moreover, the tablets preferably break when submerged in water in less than 3 minutes, but greater than 1 minute to ensure acceptable cleaning time before dissolving.

The cleaning compositions will preferably include a fragrance. The dye system is combined with the cleaning composition and formed into a tablet or "puck" having a top surface and a bottom surface having a diameter and a height extending from the top surface to the bottom surface, the top surface having an indentation in at least one of its surfaces that is adapted to receive and engage a wand.

Compressed compositions retain sufficient hardness to facilitate cleaning a toilet surface but are still able to substantially dissolve and have a time to breakage when submerged in toilet water of less than 5 minutes to enable easy disposal by flushing with toilet water.

The anionic surfactant is preferably selected from Sodium Dodecylbenzenesulfonate, Sodium Cocoyl Isethionate, Sodium Olefin Sulphonate, and combinations thereof. In certain preferred embodiments, the anionic surfactant consists of an alpha olefin sulfate, such as Sodium Olefin Sulphonate. In some embodiments, the anionic surfactant is present at about 5% to about 50% by weight of the composition, more preferably about 10% to about 30% by weight of the composition, most preferably about 12% to about 25% by weight of the composition. In certain embodiments, the composition contains no additional surfactant other than the anionic surfactant.

In certain embodiments, the organic acid comprises about 5% to about 60% by weight of the cleaning composition, and is selected from the group consisting of glycolic, malic, lactic, citric acid, and salts and combinations thereof. In certain of those embodiments, the acid consists of glycolic acid or citric acid. In preferred compositions, the organic acid is citric acid. More preferably, the organic acid comprises about 10% to about 45% by weight of the cleaning composition. In certain preferred embodiments, the organic acid comprises about 25% to about 45% by weight of the cleaning composition.

In certain embodiments, the organic acid buffering agent comprises about 5% to about 50% by weight of the tablet and comprises a carbonate or bicarbonate salt and/or trisodium citrate. In some of those embodiments, the buffering agent consists of a carbonate or bicarbonate salt, such as sodium bicarbonate. In certain of those embodiments, the carbonate or bicarbonate salt is present at about 20% to about 30% by weight of the compositions.

In preferable embodiments, the amount of organic acid and organic acid buffering agent are present in amount sufficient to provide toilet water with a pH less than 4.6, preferably about 4.3 to about 4.5, when the unit dose composition is dissolved in toilet water.

In certain embodiments, the composition further comprises a fragrance. When present the fragrance is about 0.5% to about 6% by weight of the unit dose composition.

In certain preferred embodiments, the composition consists essentially of or consists of anionic surfactant, organic acid, organic acid buffering agent, and a dye system comprising desiccant and water-activated dye. In some of those embodiments, the dye system includes a colorant that is different in composition from the water-soluble dye. The colorant does not materially affect the performance of the composition when used for cleaning but rather simply provides a colored appearance to the composition prior to its use.

In one aspect, a unit dose toilet cleaning composition comprises or consists essentially of an anionic surfactant; a carbonate or bicarbonate salt; an organic acid; about 0.25% to about 3%, more preferably about 0.5% to about 1.0% calcium silicate; and a water-soluble dye. Preferably, the calcium silicate is powdered. The composition may further comprise a colorant that is different in composition than the water-soluble dye. In preferred embodiments, the anionic surfactant is an alpha olefin sulphonate. In some of those embodiments, the alpha olefin comprises about 22.5% to about 25% by weight of the composition. At least 30% by weight of the unit dose dissolves within 10 minutes when left unagitated in water.

The compositions disclosed herein are preferably compressed into solids that weigh about 25 to about 45 grams and have a hardness of greater than 50 N. Preferably the tablet has a height of about 0.5 inches or greater than 0.5 inches and a diameter less than 3 inches, preferably less than 2.5 inches to ensure that the puck does not get caught in the outflow pipe of a toilet. The compressed solid has an indentation in at least one of its surfaces that is adapted to receive and engage a wand. The puck or tablet can be provided in a package with the wand member. A plurality of the pucks or tablets may be contained in a sealed package, which may or may not include a wand member that is adapted to receive and engage with the puck/tablet.

The present invention also provides methods of production of such unit dose compositions and tablets, and methods of their use in processes for cleaning toilets. In particular, a method of visually indicating application of a toilet cleaning composition to a toilet comprises providing a unit dose toilet cleaning composition as described herein and exposing a surface of the unit dose composition to water in the toilet, wherein the water-soluble dye colors the water in the toilet. In some embodiments, the method further comprises pressing the wetted surface of the unit dose composition to a surface of the toilet, wherein the water-soluble dye colors the surface of the toilet. In certain embodiments, the step of exposing consists of submerging the unit dose composition in the toilet water one or a plurality of times.

BRIEF DESCRIPTION OF THE DRAWINGS

The patent or application file contains at least one drawing (photograph) executed in color. Copies of this patent or patent application publication with color drawings will be provided by the Office upon request and payment of the necessary fee.

DETAILED DESCRIPTION OF THE INVENTION

Figure 1:
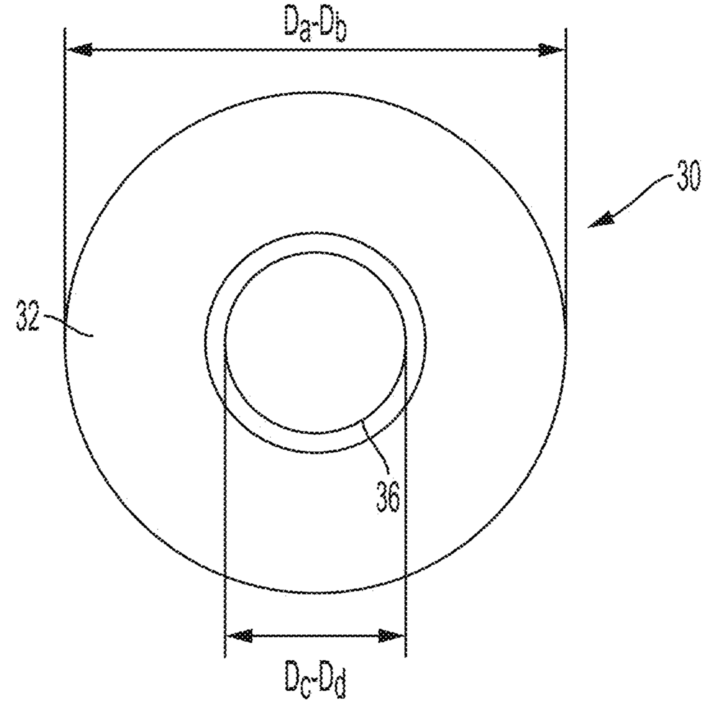
FIG. 1 is a photograph illustrating a top view of a solid unit dose toilet cleaning composition of the present invention that can be releasably attached to a wand.

The following detailed description is merely exemplary in nature and is not intended to limit the compositions or the methods for producing or using the same. Furthermore, there is no intention to be bound by any theory presented in the preceding background or the following detailed description.

Except in the operating and comparative examples, or where otherwise explicitly indicated, all numbers in this description indicating amounts or ratios of material or conditions of reaction, physical properties of materials and/or use are to be understood as modified by the word “about”.

The term “about” as used in connection with a numerical value throughout the specification and the claims denotes an interval of accuracy, familiar and acceptable to a person skilled in the art. In general, such interval of accuracy is +−10%. Thus, “about ten” means 9 to 11. All numbers in this description indicating amounts, ratios of materials, physical properties of materials, and/or use are to be understood as modified by the word “about,” except as otherwise explicitly indicated.

Weight percent, percent by weight, wt %, wt-%, % by weight, and the like are synonyms that refer to the concentration of a substance as the weight of that substance divided by the weight of the composition and multiplied by 100. As used in this application, the term “wt. %” refers to the weight percent of the indicated component relative to the total weight of the solid cleaning composition, unless indicated differently. The weight percentage of an individual component does not include any water supplied with that component, even if the component is supplied as an aqueous solution or in a liquid premix, unless otherwise specified.

The recitation of numerical ranges by endpoints includes all numbers within that range (e.g., 1 to 5 includes 1, 1.5, 2, 2.75, 3, 3.80, 4, and 5).

Provided herein are toilet cleaning products that include a dye system comprising desiccant and a water-soluble dye and a cleaning composition comprising surfactant, organic acid and an organic acid buffering agent, which are combined and compressed into a unit dose tablet or “puck.” A wand that can releasably engage the tablet such that the combination can be used as a toilet cleaning brush. The dye system colors toilet water and a toilet surface when the unit does is used to clean the toilet. The unit dose tablets are capable of dissolving in water in a short amount of time so that they can be flushed down the toilet after use.

“Cleaning” means to perform or aid in soil removal, bleaching, microbial population reduction, or combination thereof.

“Desiccant” is a substance capable of absorbing moisture from a surrounding atmosphere. Desiccants differ from conventional absorbent and superabsorbent materials in that desiccants absorb water or water vapor in capillary channels or via chemical bonding to water, such that the absorption results in no appreciable increase in the volume of the desiccant.

As used herein, the term “comprising” means including, made up of, composed, containing, characterized by, or having.

As used herein, the term “brush” means an implement with a handle and including of a solid member at one end that can be used for cleaning, scrubbing, applying a liquid or powder to a surface. The solid member of the brush may be referred to as a “head.” The heads described herein are compressed tablets.

A unit dose refers to a cleaning composition unit sized so that the entire unit is used during a single cleaning cycle. Typically, a unit dose will weigh about 15 to 40 grams. A plurality of the unit doses can be available in a package having a size of between about 40 grams and about 1,000 grams.

The various embodiments of the unit dose have a top surface, a bottom surface, and a height extending from the top surface to the bottom surface. The unit dose comprises an indentation in at least one of its surfaces that is adapted to receive and engage a wand. Preferably, the indentation is from 25% to 100% of the height of the solid.

Figure 2:
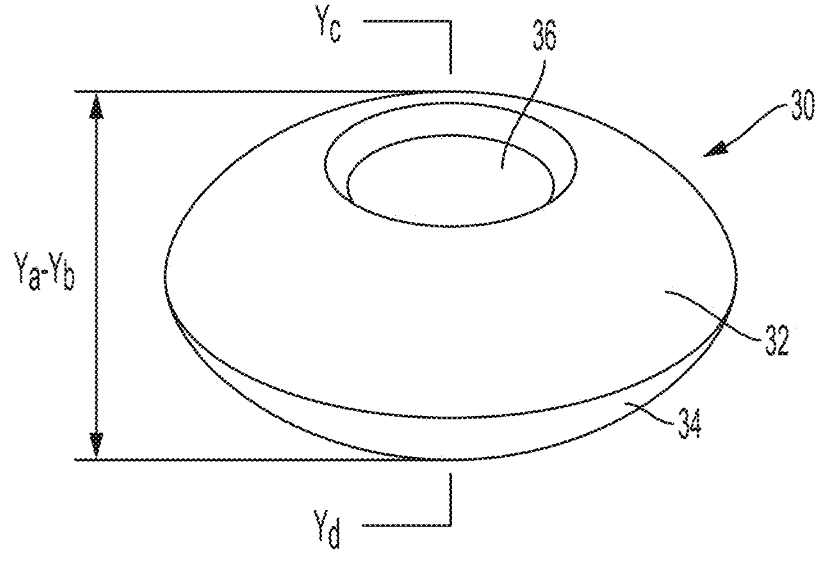
FIG. 2 is a perspective view of the unit dose of FIG. 1.
Figure 3:
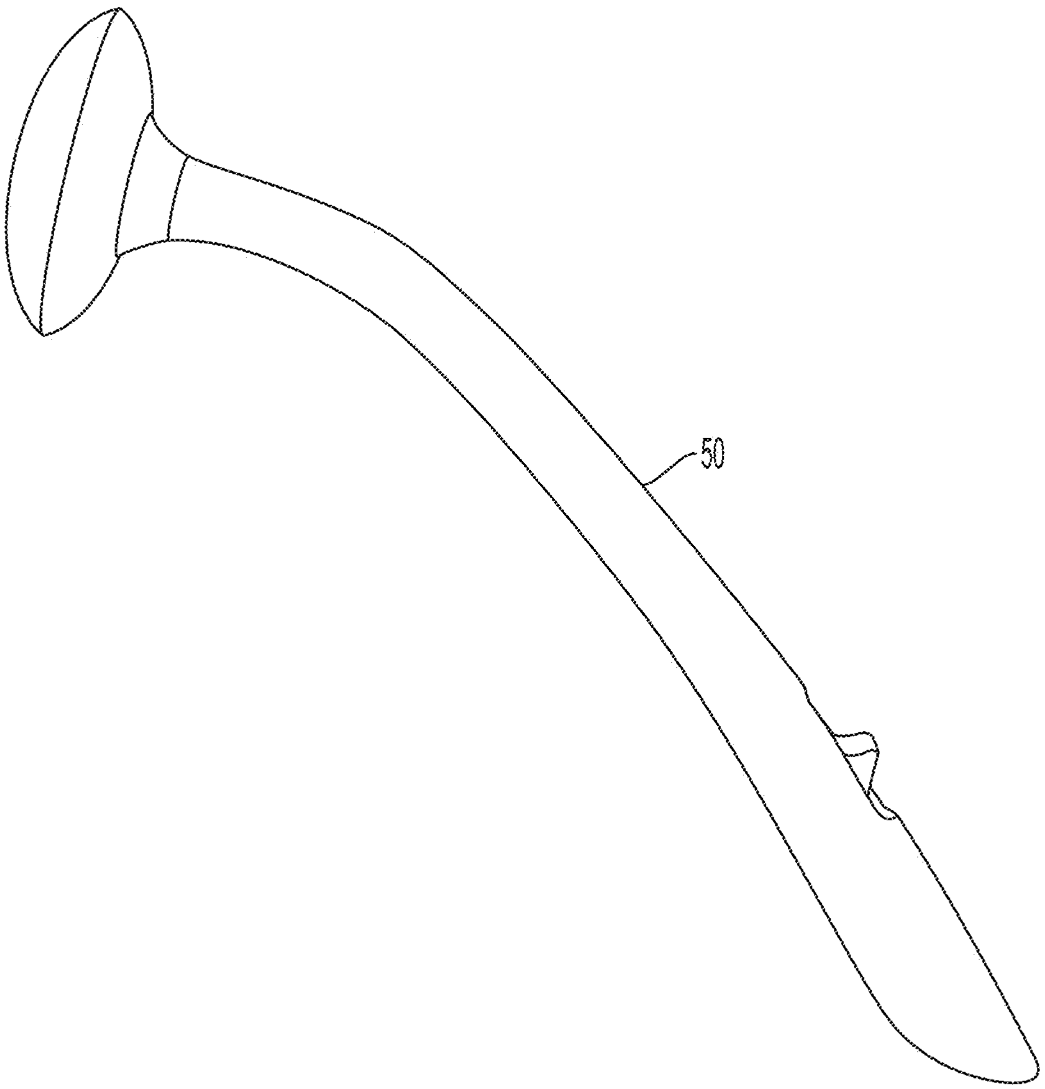
FIG. 3 shows an exemplary re-useable wand that can be used with a tableted composition described herein.

An exemplary solid unit dose head of the present invention is shown in FIGS. 1 and 2. The head 30 contains a top surface 32, a bottom surface 34, a height $Y_a$-$Y_b$ extending from the top surface to the bottom surface, and a diameter $D_a$-$D_b$. An indentation, specifically, a cylindrical socket 36 is contained in the top surface and is adapted to receive and frictionally engage with wand 50, as shown in FIG. 3. The socket 36 has a diameter $D_e$-$D_d$ that is less than the diameter $D_a$-$D_b$. The depth $Y_c$-$Y_d$ of the cylindrical socket 36 is the same as height $Y_a$-$Y_b$ or may be less than the height $Y_a$-$Y_b$.

The unit dose head 30 contains a dye system and a cleaning composition comprised of powders, granules, and/or pellets that have been compressed into a tablet.

Although cleaning head 30 is shown as substantially cylindrical and having a diameter $D_a$-$D_b$, it may take other shapes that will be appreciated by those of skill in the art. The solid head 30 may be in various compressed forms including, for example, pellets, blocks, and tablets, but not powders. Likewise, the socket 36 may take other shapes, which may or may not correspond to the shape of tablet 30.

In certain embodiments, the solid unit dose cleaning head 30 weighs about 1 to about 70 grams, more preferably about 10 to about 50 grams or about 25 to about 45 grams, most preferably about 15 to about 40 grams.

Due to clogging concerns, it is preferable that any dimension of head 30 be less than 3 inches, as a standard outflow pipe of a toilet is 3 inches in diameter (inside diameter). In older houses, it may be possible for the outflow pipe to be closer to 2 inches (inside diameter), so pucks closest to 2 inches in diameter may be most preferred. In some preferred embodiments, the solid unit dose cleaning head has a height to diameter ratio between 0.2 and 0.3.

The solid unit dose cleaning head is typically a tablet having a hardness of at least 15 N. The solid unit dose toilet cleaning composition and/or dissolvable toilet cleaning tablet preferably has a hardness above 30 N, most preferably above 50 N.

The compositions that make up tablet 30 contain one or more chemical constituents e.g., cleaning agents, disinfecting agents, dye system, and optionally, coloring agents, and fragrance in the form of a head. The cleaning activity is formed by water contacting the head of the device coming into contact with the one or more chemical constituents.

In preferred embodiments, the unit dose composition provides cleaning efficacy, a foaming visual cue, fragrance sensorial experience and slowly dissolves so one does not have to re-store or throw away the cleaning head portion of the product. The toilet cleaning head is advantageously dissolvable, which negates the need for the consumer to store an unpleasant, bacteria filled cleaning tool. The components of unit dose composition are described in further detail herein.

Dye System

A dye system for use in the unit dose compositions comprises a desiccant, a water-soluble dye, and optionally a colorant.

Dye

Water-soluble dyes suitable for use in the compositions may be anionic or nonionic. Examples of water-soluble dyes include, but are not limited to, Acid Blue #9, FD&C Yellow #5, FD&C Red #33, and D&C Green #8. It is preferable to use a dye that is safe for use in toilet care, i.e., will not stain toilet surfaces.

The amount of water-soluble dye can range from about 0.005% to about 0.1%, more preferably about 0.01% to about 0.05% by weight of the unit dose composition.

In certain embodiments, the water-soluble dye is anionic. In some of those embodiments, the water-soluble dye is Acid Blue 9 (triphenylmethane).

In certain preferred embodiments, the water-soluble dye is a polymeric colorant. In some of those embodiments, the water-soluble dye is an anthraquinone.

Desiccant

Suitable desiccant components include without limitation anhydrous salts which absorb water or moisture to form a stable hydrated salt, capillary desiccants which rely on fine capillaries between adjacent desiccant particles to absorb moisture, and chemical desiccants which chemically react with water to form stable compounds. Examples of anhydrous salts include without limitation sodium acetate, calcium sulfate, zinc chloride, zinc bromide, calcium oxide, and combinations thereof. Examples of capillary desiccants include without limitation montmorillonite clay, molecular sieves (e.g., synthetic zeolites), silica gels, starches and the like.

A particularly preferred desiccant is powdered precipitated calcium silicate.

Desiccant may be included from about 0.2% to about 3% by weight of the unit dose composition. More preferably, desiccant comprises about 0.5% to about 2.0% by weight, most preferably about 0.5% to about 1.5% by weight of the unit dose composition. When the amount of desiccant is too low, residual water in the unit dose composition ingredients and in the environment will activate the water-soluble dye and it will color the unit dose during manufacture and storage and a sufficient amount will not remain to color the toilet surface and/or water during use.

Colorant

The dye system may further include a colorant which provides color to the unit dose composition prior to it being wetted by toilet water. The colorant may be oil- or water-soluble, and typically is an anhydrous powder dye. The choice of the colorant will depend largely on the color desired for the water into which the cleaning compositions is to be dispensed. Oil-soluble colorants may be utilized. Particularly suitable colorants are lake pigments.

The amount of colorant used depends on the color intensity desired and the cost of the dye, and may be added at levels up to about 2.5% by weight of the unit dose composition. The colorants are preferably incorporated in an amount of particularly in an amount of 0.0005 to 0.075 wt %, and particularly preferably from 0.001 to 0.01 wt %.

The desiccant, water-soluble dye, and optional colorant can be combined with the cleaning composition using any suitable mixing apparatus.

Cleaning Composition

The cleaning composition can contain a variety of ingredients selected from surfactants, organic acid, organic acid buffering agents, cohesion polymer, and may also contain fragrance, dye, flow aid, colorant, binder, lubricant, glidant, soap, and boron compounds. Water range of the ingredients typically ranges from 0.04 to about 0.68. The ideal water activity of ingredients falls between 0.14 to 0.25. Specific ingredients and amounts are further discussed herein.

Surfactant

The toilet cleaning composition comprises one or more surfactants, of which one or more is anionic, and the additional surfactants may be cationic and/or non-ionic and/or semi-polar and/or zwitterionic, or a mixture thereof. In a particular embodiment, the cleaning composition includes a mixture one or more anionic surfactants with one or more non-ionic surfactants. The total active surfactant(s) is typically present at a level of from about 5% to 50% by weight, such as about 10% to about 30%, or about 12% to about 25%, based on total weight of the unit dose composition. The surfactant(s) is chosen based on the desired cleaning application, and may include any conventional surfactant(s) known in the art.

The anionic surfactants used in this invention can be any anionic surfactant that is substantially water soluble. "Water soluble" surfactants are, unless otherwise noted, here defined to include surfactants which are soluble or dispersible to at least the extent of 0.01% by weight in distilled water at 25° C. "Anionic surfactants" are defined herein as amphiphilic molecules with an average molecular weight of less than about 10,000, comprising one or more functional groups that exhibit a net anionic charge when in aqueous solution at pH of between 6 and 11.

Non-limiting examples of anionic surfactants include sulfates and sulfonates, in particular, linear alkylbenzenesulfonates (LAS), isomers of LAS, branched alkylbenzenesulfonates (BABS), phenylalkanesulfonates, alpha-olefinsulfonates (AOS), olefin sulfonates, alkene sulfonates, alkane-2,3-diylbis(sulfates), hydroxyalkanesulfonates and disulfonates, alkyl sulfates (AS) such as sodium dodecyl sulfate (SDS), fatty alcohol sulfates (FAS), primary alcohol sulfates (PAS), alcohol ethersulfates (AES or AEOS or FES, also known as alcohol ethoxysulfates or fatty alcohol ether sulfates), secondary alkanesulfonates (SAS), paraffin sulfonates (PS), ester sulfonates, sulfonated fatty acid glycerol esters, alpha-sulfo fatty acid methyl esters (alpha-SFMe or SES) including methyl ester sulfonate (MES), alkyl- or alkenylsuccinic acid, dodecenyl/tetradecenyl succinic acid (DTSA), fatty acid derivatives of amino acids, diesters and monoesters of sulfo-succinic acid or salt of fatty acids (soap), and combinations thereof.

The anionic surfactant may be, for example, Sodium Xylene Sulphonate, Sodium Dodecylbenzenesulfonate, Sodium C14-C16 Alpha Olefin Sulfonate, Sodium Cocosulfate, Sodium Lauryl Sulfate, Sodium Cocoyl Isethionate, Sodium Olefin Sulphonate. The anionic surfactant may consist of an alpha olefin sulphonate.

In some preferred embodiments, the anionic surfactant is a LAS.

In certain preferred embodiments, the anionic surfactant is selected from Sodium Dodecylbenzenesulfonate, Sodium Cocoyl Isethionate, Sodium Olefin Sulphonate, and combinations thereof.

The unit dose composition will usually contain from about 5% to about 50% by weight of anionic surfactant. In certain embodiments, the unit dose composition contains about 7% to about 35% by weight of anionic surfactant. In some preferred embodiments, the unit dose compositions contain about 10% to about 30% by weight of anionic surfactant.

The amount of anionic surfactant utilized may be dependent on the choice and amount of filler and the desired dissolution rate of a solid unit dose formed from the cleaning composition, as is discussed in further detail below.

Non-ionic surfactants ("NI") are useful in the context of this invention to both improve the cleaning properties of the compositions, when used as a detergent, and to contribute to product stability. A wide range of non-ionic surfactants can be used herein. For example, the non-ionic surfactants include, but are not limited to alkoxylated alcohols, polyoxyalkylene alkyl ethers, polyoxyalkylene alkylphenyl ethers, polyoxyalkylene sorbitan fatty acid esters, polyoxyalkylene sorbitol fatty acid esters, polyalkylene glycol fatty acid esters, alkyl polyalkylene glycol fatty acid esters, polyoxyethylene polyoxypropylene alkyl ethers, polyoxyalkylene castor oils, polyoxyalkylene alkylamines, glycerol fatty acid esters, alkylglucosamides, alkylglucosides, alkylamine oxides, or a combination thereof. Preferably, the nonionic surfactant is a glucamide in aqueous-alcoholic solution, such as Capryloyl/Caproyl Methyl Glucamide.

If included in the cleaning compositions, the amount of NI is typically about 1% to about 20% by weight based on the total weight of the unit dose composition. Preferably, the NI is at least about 1.5%, most preferably about 1.5% to about 15% based on total weight of the unit dose composition.

When included therein the unit dose will usually contain from about from about 1% to about 40% by weight of a cationic surfactant, for example from about 0.5% to about 30%, in particular from about 1% to about 20%, from about 3% to about 10%, such as from about 3% to about 5%, from about 8% to about 12% or from about 10% to about 12% by weight. Non-limiting examples of cationic surfactants include alkyldimethylethanolamine quat (ADMEAQ), cetyltrimethylammonium bromide (CTAB), dimethyldistearylammonium chloride (DSDMAC), and alkylbenzyldimethylammonium, alkyl quaternary ammonium compounds, alkoxylated quaternary ammonium (AQA) compounds, ester quats, and combinations thereof.

The composition may contain from about 0% to about 40% by weight of a semipolar surfactant. Non-limiting examples of semipolar surfactants include amine oxides (AO) such as alkyldimethylamineoxide, N-(coco alkyl)-N, N-dimethylamine oxide and N-(tallow-alkyl)-N,N-bis(2-hydroxyethyl)amine oxide, and combinations thereof.

The composition may contain from about 0% to about 40% by weight of a zwitterionic surfactant. Non-limiting examples of zwitterionic surfactants include betaines such as alkyldimethylbetaines, sulfobetaines, and combinations thereof.

Organic Acid

Examples of acids suitable for use the cleaning compositions include, but are not limited to, tartaric acid, citric acid, fumaric acid, adipic acid, malic acid, oxalic acid, or sulfamic acid, either alone or in combination. Typically, the compositions are prepared from citric acid or a combination of citric acid and glycolic acid.

The acid comprises about 1% to about 60% by weight of the unit dose composition.

The acid and an organic acid buffering agent, e.g., carbonate or bicarbonate salt, may result in the composition being effervescent. In certain embodiments, the presence of bubbles results from the formation of carbon dioxide. For instance, when added to a liquid, such as water, a mixture of at least one organic acid and at least one carbonate or bicarbonate salt results in a chemical reaction that liberates carbon dioxide. In one aspect, both the acid and the salt may be in anhydrous form.

The term "effervescent," as defined herein, means any product capable of forming bubbles in liquid environments and may also be considered any product capable of liberating carbon dioxide in or out of liquid environments. Likewise, "effervescence" means forming bubbles in liquid environments or liberating carbon dioxide in or out of liquid environments.

Organic Acid Buffering Agent

Examples of organic acid buffering agents are carbonate or bicarbonate salts. Carbonate or bicarbonate salts suitable for use in illustrative embodiments include, but are not limited to, the alkali metal salts. sodium carbonate, calcium carbonate, magnesium carbonate, ammonium carbonate, potassium carbonate, sodium bicarbonate, and calcium bicarbonate may all be employed.

The carbonate or bicarbonate salts may be added in an amount of about 1% to about 50% by weight of the composition, more preferably about 5% to about 30% by weight of the composition, most preferably about 10% to about 20% by weight of the composition.

In preferred embodiments, the organic acid and organic acid buffering agent are included in the unit dose composition in a ratio that results in pH 4.3 to 4.5 toilet water after use.

Cohesion Polymer

The cleaning composition can include water-soluble binder. Those having a having a weight average molecular weight less than 200,000 will typically be more readily soluble in water. Many water-soluble binders are known. The water-soluble binder may be oligomeric or polymeric, and may include copolymers and blends thereof. Nonlimiting examples of polymers and copolymers suitable for use as water-soluble binders include polyethylene glycol, polyvinylpyrrolidones, polyvinylpyrrolidone/vinyl acetate copolymers, polyvinyl alcohols, carboxymethyl celluloses, hydroxypropyl cellulose starches, polyethylene oxides, polyacrylamides, polyacrylic acids, cellulose ether polymers, polyethyl oxazolines, esters of polyethylene oxide, esters of polyethylene oxide and polypropylene oxide copolymers, urethanes of polyethylene oxide, and urethanes of polyethylene oxide and polypropylene oxide copolymers.

In one embodiment, a preferred binder is polyethylene glycol having a weight average molecular weight greater than 3,350.

The cohesion polymer/binder may be present from 0% to 25% by weight of the unit dose composition, preferably from about 5% to about 20%, most preferably from 8% to about 18% by weight of the unit dose composition.

Filler

The compositions can include about 0% by about 80% fillers, more preferably about 2% to about 55%, most preferably about 4% to about 50% by weight of fillers.

In certain embodiments, the filler comprises a water-soluble salt, a clay, a sugar, and/or a cellulose. In some of those embodiments, the filler consists of water-soluble salt and clay. In other embodiments, the filler consists of water-soluble salt and a cellulose, such as microcrystalline cellulose. In yet other embodiments, the filler consists of water-soluble salt.

The water-soluble salt can be, for example, a water-soluble inorganic alkali metal salt, a water-soluble organic alkali metal salt, a water-soluble inorganic alkaline earth metal salt, a water-soluble organic alkaline earth metal salt, a water-soluble carbohydrate, a water-soluble silicate, a water-soluble urea, or any combination thereof. Examples include various alkali metal and/or alkaline earth metal sulfates, chlorides, borates, and citrates.

Specific inert salts which may be selected include sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate.

Cellulose fillers include microcrystalline cellulose ("MCC") and powdered cellulose, which are commercially available as inactive fillers in processed foods and pharmaceuticals. Instead of or in addition to powdered cellulose, cellulose derivatives such as ethyl cellulose, hydroxypropyl cellulose, carboxymethylcellulose, hydroxypropyl methyl cellulose, hydroxyethylmethyl cellulose, hydroxyethyl cellulose can be used. Preferably, the cellulose filler is microcrystalline cellulose.

A sugar filler may also be used. In the present context, sugar fillers refer to saccharide containing components commonly known in the art, such as sucrose, dextrose, maltose, saccharose, lactose, sorbose, dextrin, trehalose, D-tagatose, dried invert sugar, fructose, levulose, galactose, corn syrup solids, and the like, alone or in combination.

The filler can be, for example, dextrose, fructose, galactose, isoglucose, glucose, sucrose, raffinose, isomalt, xylitol, or any combination thereof.

In some embodiments, the filler may include a clay. In one embodiment, the clay is a smectite clay, e.g., a Bentonite clay, Beidellite clay, a Hectorite clay, a Laponite clay, a Montmorillonite clay, a Nontronite clay, a Saponite clay, a Sauconite, clay, or any combination thereof.

In one embodiment, the clay is a Bentonite clay.

The filler may comprise abrasive particles. By including abrasive particles, the cleaning composition provides for both scouring and cleaning of a surface. The carbonate or bicarbonate salt may in conjunction with the selected filler provide the cleaning composition with the aforementioned abrasive particles.

In certain embodiments a boron compound, such as borax, may be used in the compositions.

The other components of the cleaning composition can act as a binder and carrier to secure the abrasive particles until they are exposed to a solvent. For instance, the water-soluble binder may be a surfactant. Additionally, the water-soluble binder may include a combination of various water-soluble binders, one of which may be a surfactant. Also, the water-soluble binder may include a combination of various surfactants. A surfactant is preferable because it provides additional cleaning capabilities to the cleaning composition.

The abrasive particles include the abrasive materials as well as combinations and agglomerates of such materials. In applications where aggressive scouring or other end uses are not contemplated or desired, softer abrasive particles (e.g., those having a Mohs' hardness in the range between 1 and 7) can be used to provide the head 30 with a mildly abrasive surface. Harder abrasive materials (e.g., having a Mohs' hardness greater than about 8) can also be included within the abrasive cleaning article of the invention to provide a finished article having a more aggressive abrasive surface. The abrasive particles begin to be released from the cleaning composition when it is submerged in water as the binder dissolves in the water.

Virgin Soap Pellets

Virgin soap pellets, such as those used to make soap bars, can also be used as a filler, and/or filler and binder and to improve the cleaning performance of the compositions. In a typical soap making operation, after the soap is dried it is usually pelletized and then subject to amalgamation in a piece of equipment called an amalgamator where a non-aqueous slurry of colorant, perfume and optional additives that are desired in the final product (such as antibacterial agents, polymers, silicones, encapsulated materials) are added. As used herein, "virgin soap pellets" refers to the soap pellets produced prior to the addition of colorant, perfume, and optional additives.

That is, the virgin soap pellets contemplated herein comprise one or more "soaps," which, for purposes of describing this component of the compositions of the present invention, have the meaning as normally understood in the art: monovalent salts of monocarboxylic fatty acids.

The counterions of the salts generally include sodium, potassium, ammonium, and alkanol ammonium ions, but may include other suitable ions known in the art.

Typically, the soap components comprise salts of long chain fatty acids having chain links of the alkyl group of the fatty acids from about 8 carbon atoms, to about 18 carbon atoms in length. The particular length of the alkyl chain of the soaps is selected for various reasons including cleansing capability, lather capability, cost, and the like. Preferred soaps are those having a carbon chain length of from 12 to 24, preferably from 14 to 18 carbon atoms. These monovalent salts would normally be sodium salts, although some cations, such as K, Mg or alkanolammonium ions could be used. The preferred insoluble fatty acid soap is at least 90% by weight, more preferably at least 95% by weight selected from the group consisting of sodium tallowate, sodium palm kernelate, sodium myristate, sodium palmitate, sodium stearate and mixtures of any two or more thereof. Other insoluble soaps, particularly higher fatty acid insoluble soaps, can also be used. An 85/15 ratio of tallow to palm kernel fatty acids is particularly preferred as the pure soap component of virgin soap pellets.

The virgin soap pellets will typically include greater than 50% by weight of a soap mixture. Preferably, the soap pellet base will include about 55% to about 90% by weight of one or more soaps. In a preferred embodiment of the invention, the soap mixture comprises about 70% to about 75% by weight of the soap pellet base composition.

Among the additives employed in the soap pellet base are free fatty acids (FFA) which serve to enhance the lathering or foaming ability of the bars. Such fatty acids also have an effect on the mildness of the soap.

Exemplary useful fatty acids include, but are not limited to: Arachidic Acid, Arachidonic Acid, Beeswax Acid, Behenic Acid, Capric Acid, Caproic Acid, Caprylic Acid, C10-40 Hydroxyalkyl Acid, C10-40 Isoalkyl Acid, C32-36 Isoalkyl Acid, Coconut Acid, Corn Acid, Cottonseed Acid, Erucic Acid, Hydrogenated Coconut Acid, Hydrogenated Menhaden Acid, Hydrogenated Palm Acid, Hydrogenated Tallow Acid, Hydroxystearic Acid, Isomerized Linoleic Acid, Isomerized Safflower Acid, Isostearic Acid, Lauric Acid, Linoleic Acid, Linolenic Acid, Linseed Acid, Myristic Acid, Oleic Acid, Olive Acid, Palmitic Acid, Palm Kernel Acid, Peanut Acid, Pelargonic Acid, Rapeseed Acid, Rice Bran Acid, Ricinoleic Acid, Safflower Acid, Soy Acid, Stearic Acid, Sunflower Seed Acid, Tall Oil Acid, Tallow Acid, Undecanoic Acid, Undecylenic Acid, Wheat Germ Acid.

In certain embodiments, the virgin soap pellet base comprises about 0.5% to 5% free fatty acids.

The soap pellets may comprise one or a combination of water-soluble polyhydric organic solvents including Preferred water soluble organic polyols having two hydroxyl groups (2-OH) include those selected from the group consisting of: propylene glycol; dipropylene glycol; butylene glycol; ethylene glycol; 1,7-heptanediol; monoethylene glycols, polyethylene glycols, polypropylene glycols of up to 8,000 molecular weight; mono-$C_{1-4}$ alkyl ethers of any of the foregoing; and mixtures thereof. Preferred water-soluble polyhydric solvents that have at least three hydroxyl groups (3*-OH) include glycerine, and any sugar alcohol, such as sorbitol.

Examples of suitable sugar alcohols include: Tetritols: Erythritol, threitol, D-threitol, L-threitol, and D,L-threitol; Pentitols: Ribitol, arabinitol, D-arabinitol, L-arabinitol, D,L-arabinitol and xylitol; Hexitols: Allitol, dulcitol (galacitol), glucitol, sorbitol, (D-glucitol), L-glucitol, D,L-glucitol, D-mannitol, L-mannitol, D,L-mannitol, altritol, D-altritol, L-altritol, D,L-altritol, iditol, D-iditol, and L-iditol; Disaccharide alcohols: Maltitol, lactitol and isomalt.

Preferably, the soap pellet base composition comprises glycerin, sorbitol, or a mixture of glycerin and sorbitol. In one exemplary embodiment, the soap pellet base comprises about 5% to about 10% by weight glycerin.

Preferably, the soap base composition also comprises water. In one exemplary embodiment of the present invention, the soap pellet base composition comprises about 10 to about 20% by weight water. In a preferred embodiment of the present invention, the soap pellet base composition comprises about 12 to about 16% by weight water.

The soap pellets may further comprise one or more chelating agents, organic and inorganic salts, and/or stabilizers.

A soap mixture may be manufactured by saponifying suitable raw oils, such as, for example, tallow, palm oil, stearin oil and palm kernel oil, with a caustic solution, such as sodium hydroxide, to form a "neat soap." The pH of the neat soap may be alkaline when produced and can be suitably adjusted by the addition of an organic acid, such as citric acid. Free fatty acid may also be added to the neat soap to neutralize any undesirable excess caustic solution and to enhance the lather characteristics of the resulting soap. Optionally, at this stage of the process, preservative agents, chelating agents, and inorganic and/or organic salts may also be added to form the soap pellet base composition. The neat soap may then be spray dried to reduce the moisture content of the soap, yielding soap pellets. In one embodiment of the invention, the moisture content is reduced to about 10% by weight of the soap pellets, with about 5% available water.

As an example, the MSDS of one type of DIAL® Bar Soap suitable for use in the cleaning compositions discloses the composition/information on ingredients shown in Table 1.

TABLE 1

| CAS No. | Ingredient | Wt % |
|---|---|---|
| 67701-11-5 & 67701-10-4 | Sodium Soap | 60-100 |
| 56-81-5 | Glycerin | 1-5 |

Additionally, various virgin soap pellets or the like have been disclosed in U.S. Pat. Nos. 5,296,159, 5,534,265, 5,585,104, 5,703,026, 5,720,961, 5,952,289, 5,965,508, 6,054,425, and 6,172,026, the disclosures of which are incorporated into this application in their entireties. It is contemplated that such products are interchangeable with the virgin soap pellets used in the Examples herein.

When included, the compositions typically comprise about 5% to about 50% by weight, more preferably about 8% to about 30%, most preferably about 12% to about 20% by weight of virgin soap pellets based on total weight of the unit dose composition. In certain preferred embodiments, the cleaning composition is substantially free of soap and/or soap pellets. In some of those embodiments, the cleaning composition is free of soap and/or soap pellets.

In certain embodiments, the virgin soap pellets have water activity of about 0.68. As mentioned, water range of ingredients typically ranges from 0.04 to about 0.68 but the ideal water activity of ingredients falls between 0.14 to 0.25. The soap pellets can optionally be dried to lower the water activity to as low as 0.04 if needed and will help reduce the available moisture in the formula. Both undried and dried pellets yield useful solid toilet cleaning products, but dried pellets may be preferred in some instances due to less moisture in a final compressed product.

Based on literature and Karl Fisher analysis of virgin soap pellets utilized, virgin soap pellets may have about 10% total moisture content with about ~5% available water. Both undried (i.e., untreated) soap pellets and dried soap pellets have yielded useful products, but dried soap products may be preferable due to less moisture in the total product.

In some embodiments, a ratio of virgin soap pellets to surfactant is from 0.5:1 to 2:1, or from about 1:1 to 1.5:1, more preferably about 1.2:1 to 1.3:1. Such ratios can improve the physical characteristics of the formula (e.g., strength, stability, longevity) while providing a sufficient level of dissolution.

Although described in terms of pellets, the soap pellet base composition may be prepared in other forms for addition into cleaning compositions. The term "virgin soap pellets" is meant to encompass pellets as well as other forms (e.g., granules, ribbons, slugs) of the virgin soap base composition described herein.

Fragrance

The cleaning compositions preferably include fragrance and/or perfume. In some of embodiments, the fragrance may be released into the atmosphere through the formation of carbon dioxide. The fragrance is typically present in an amount of up to about 6% by weight of the unit dose composition.

The fragrance may be an oil fragrance, an essential oil, botanical extracts, synthetic fragrance materials, or other compounds that provide a desirable odor.

In some embodiments, a fragrance oil can be, for example, essential oils such as angelica root oil, anise oil, arnica blossom oil, basil oil, bay oil, champaca blossom oil, citrus oil, silver fir oil, silver fir cone oil, elemi oil, eucalyptus oil, fennel oil, pine needle oil, galbanum oil, geranium oil, ginger grass oil, guaiac wood oil, gurjun balsam oil, helichrysum oil, ho oil, ginger oil, iris oil, jasmine oil, cajeput oil, calamus oil, chamomile oil, camphor oil, canaga oil, cardamom oil, cassia oil, pine needle oil, copaiba balsam oil, coriander oil, spearmint oil, caraway oil, cumin oil, labdanum oil, lavender oil, lemongrass oil, lime blossom oil, lime oil, mandarin oil, balm oil, mint oil, musk seed oil, muscatel oil, myrrh oil, clove oil, neroli oil, niaouli oil, olibanum oil, orange blossom oil, orange oil, origanum oil, palmarosa oil, patchouli oil, peru balsam oil, petitgrain oil, pepper oil, peppermint oil, pimento oil, pine oil, rose oil, rosemary oil, sage oil, sandalwood oil, celery oil, spike oil, star anise oil, turpentine oil, thuja oil, thyme oil, verbena oil, vetiver oil, juniper berry oil, wormwood oil, wintergreen oil, ylang-ylang oil, hyssop oil, cinnamon oil, cinnamon leaf oil, citronella oil, lemon oil and cypress oil and ambrettolide, ambroxan, alpha-amylcinnamaldehyde, anethol, anisaldehyde, anise alcohol, anisol, anthranilic acid methyl ester, acetophenone, benzyl acetone, benzaldehyde, benzoic acid ethyl ester, benzophenone, benzyl alcohol, benzyl acetate, benzyl benzoate, benzyl formate, benzyl valerianate, borneol, bornyl acetate, boisambrene forte, alpha-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, heptine carboxylic acid methyl ester, heptaldehyde, hydroquinone dimethyl ether, hydroxycinnamaldehyde, hydroxycinnamyl alcohol, indol, irone, isoeugenol, isoeugenol methyl ether, isosafrole, jasmone, camphor, carvacrol, carvone, p-cresol methyl ether, cumarin, p-methoxyacetophenone, methyl n-amyl ketone, methyl anthranilic acid methyl ester, p-methyl acetophenone, methyl chavicol, p-methyl quinoline, methyl beta-naphthyl ketone, methyl n-nonyl acetaldehyde, methyl n-nonyl ketone, muscone, beta-naphthol ethyl ether, beta-naphthol methyl ether, nerol, n-nonyl aldehyde, nonyl alcohol, n-octyl aldehyde, p-oxy-acetophenone, pentadecanolide, beta-phenyl ethyl alcohol, phenyl acetic acid, pulegone, safrole, salicylic acid isoamyl ester, salicylic acid methyl ester, salicylic acid hexyl ester, salicylic acid cyclohexyl ester, santalol, sandelice, skatole, terpineol, thymene, thymol, troenan, gamma-undelactone, vanillin, veratrum aldehyde, cinnmaldehyde, cinnamyl alcohol, cinnamic acid, cinnamic acid ethyl ester, cinnamic acid benzyl ester, diphenyl oxide, limonene, linalool, linalyl acetate and propionate, melusat, menthol, menthone, methyl n-heptenone pinene, phenyl acetaldehyde, terpinyl acetate, citral, citronellal, and mixtures thereof.

In some embodiments, the fragrance can be an ester, an ether, an aldehyde, a ketone, an alcohol, a hydrocarbon, an essential oil, and a combination thereof.

In some embodiments, the fragrance can be, for example, adoxal (2,6,10-trimethyl-9-undecenal), anisaldehyde (4-methoxybenzaldehyde), cymal (3-(4-isopropyl-phenyl)-2-methylpropanal), ethylvanillin, florhydral (3-(3-isopropylphenyl)butanal), helional (3-(3,4-methylenedioxyphenyl)-2-methylpropanal), heliotropin, hydroxycitronellal, lauraldehyde, lyral (3- and 4-(4-hydroxy-4-methylpentyl)-3-cyclohexene-1-carboxaldehyde), methyl nonyl acetaldehyde, lilial (3-(4-tert-butylphenyl)-2-methylpropanal), phenyl acetaldehyde, undecylenaldehyde, vanillin, 2,6,10-trimethyl-9-undecenal, 3-dodecen-1-al, alpha-n-amylcinnamaldehyde, melonal (2,6-dimethyl-5-heptenal), 2,4-dimethyl-3-cyclohexene-1-carboxaldehyde (triplal), 4-methoxybenzaldehyde, benzaldehyde, 3-(4-tert-butylphenyl)propanal, 2-methyl-3-(paramethoxyphenyl) propanal, 2-methyl-4-(2,6,6-timethyl-2(1)-cyclohexen-1-yl)butanal, 3-phenyl-2-propenal, cis-/trans-3,7-dimethyl-2,6-octadien-1-al, 3,7-dimethyl-6-octen-1-al, [(3,7-dimethyl-6-octenyl)oxy]acetaldehyde, 4-isopropylbenzylaldehyde, 1,2,3,4,5,6,7,8-octahydro-8,8-dimethyl-2-naphthaldehyde, 2,4-dimethyl-3-cyclohexene-1-carboxaldehyde, 2-methyl-3-(isopropylphenyl)propanal, 1-decanal, 2,6-dimethyl-5-heptenal, 4-(tricyclo[5.2.1.0(2,6)]decylidene-8)butanal, octahydro-4,7-methano-Hindenecarboxaldehyde, 3-ethoxy-4-hydroxybenzaldehyde, para-ethyl-alpha,alphadimethylhydrocinnamaldehyde, alpha-methyl-3,4-(methylenedioxy)hydrocinnamaldehyde, 3,4-ethylenedioxybenzaldehyde, alphan-hexylcinnamaldehyde, m-cymene-7-carboxaldehyde, alpha-methyl phenylacetaldehyde, 7-hydroxy-3,7-dimethyloctanal, undecanal, 2,4,6-trimethyl-3-cyclohexene-1-carboxaldehyde, 4-(3)(4-methyl-3-pentenyl)-3-cyclohexenecarboxaldehyde, 1-dodecanal, 2,4-dimethylcyclohexene-3-carboxaldehyde, 4-(4-hydroxy-4-methylpentyl)-3-cylohexene-1-carboxaldehyde, 7-methoxy-3,7-dimethyloctan-1-al, 2-methylundecanal, 2-methyldecanal, 1-nonanal, 1-octanal, 2,6,10-trimethyl-5,9-undecadienal, 2-methyl-3-(4-tertbutyl) propanal, dihydrocinnamaldehyde, 1-methyl-4-(4-methyl-3-pentenyl)-3-cyclohexene-1-carboxaldehyde, 5- or 6-methoxyhexahydro-4,7-methanoindane-1- or -2-carboxaldehyde, 3,7-dimethyloctan-1-al, 1-undecanal, 10-undecen-1-al, 4-hydroxy-3-methoxybenzaldehyde, 1-methyl-3-(4-methylpentyl)-3-cyclohexenecarboxaldehyde, 7-hydroxy-3J-dimethyloctanal, trans-4-decenal, 2,6-nonadienal, para-tolylacetaldehyde, 4-methylphenylacetaldehyde, 2-methyl-4-(2,6,6-trimethyl-1-cyclohexen-1-yl)-2-butenal, ortho-methoxycinnamaldehyde, 3,5,6-trimethyl-3-cyclohexene-carboxaldehyde, 3J-dimethyl-2-methylene-6-octenal, phenoxyacetaldehyde, 5,9-dimethyl-4,8-decadienal, peony aldehyde (6,10-dimethyl-3-oxa-5,9-undecadien-1-al), hexahydro-4,7-methanoindane-1-carboxaldehyde, 2-methyloctanal, alpha-methyl-4-(1-methylethyl)benzene acetaldehyde, 6,6-dimethyl-2-norpinene-2-propionaldehyde, paramethylphenoxyacetaldehyde, 2-methyl-3-phenyl-2-propen-1-al, 3,5,5-trimethylhexanal, hexahydro-8,8-dimethyl-2-naphthaldehyde, 3-propyl-bicyclo-[2.2.1]-hept-5-ene-2-carbaldehyde, 9-decenal, 3-methyl-5-phenyl-1-pentanal, methyl nonyl acetaldehyde, hexanal and trans-2-hexenal.

In some embodiments, the fragrance can be, for example, methyl betanaphthyl ketone, musk indanone (1,2,3,5,6,7-hexahydro-1,1,2,3,3-pentamethyl-4H-inden-4-one), tonalide (6-acetyl-1,1,2,4,4,7-hexamethyltetralin), alphadamascone, beta-damascone, delta-damascone, iso-damascone, damascenone, methyl dihydrojasmonate, menthone, carvone, camphor, koavone (3,4,5,6,6-pentamethylhept-3-en-2-one), fenchone, alpha-ionone, beta-ionone, gammamethyl ionone, fleuramone (2-heptylcyclopentanone), dihydrojasmone, cisjasmone, Iso E Super (1-(1,2,3,4,5,6J,8-octahydro-2,3,8,8-tetramethyl-2-naphthalenyl)ethan-1-one (and isomers)), methyl cedrenyl ketone, acetophenone, methyl acetophenone, para-methoxyacetophenone, methyl beta-naphtyl ketone, benzyl acetone, benzophenone, para-hydroxyphenylbutanone, celery ketone (3-methyl-5-propyl-2-cyclohexenone), 6-isopropyldecahydro-2-naphtone, dimethyl octenone, frescomenthe (2-butan-2-ylcyclohexan-1-one), 4-(1-ethoxyvinyl)-3,3,5,5-tetramethylcyclohexanone, methyl heptenone, 2-(2-(4-methyl-3-cyclohexen-1-yl)propyl)cyclopentanone, 1-(p-menthen-6(2)yl)-1-propanone, 4-(4-hydroxy-3-methoxyphenyl)-2-butanone, 2-acetyl-3,3-dimethylnorbornane, 6,7-dihydro-1,1,2,3,3-pentamethyl-4(5H)indanone, 4-damascol, dulcinyl(4-(1,3-benzodioxol-5-yl)butan-2-one), Hexalon (1-(2,6,6-trimethyl-2-cyclohexen-1-yl)-1,6-heptadien-3-one), isocyclemone E (2-acetonaphthone-1,2,3,4,5,6,7,8-octahydro-2,3,8,8-tetramethyl), methyl nonyl ketone, methyl cyclocitrone, methyl lavender ketone, orivone (4-tert-amylcyclohexanone), 4-tert-butylcyclohexanone, delphone (2-pentyl cyclopentanone), muscone (CAS 541-91-3), neobutenone (1-(5,5-dimethyl-1-cyclohexenyl)pent-4-en-1-one), plicatone (CAS 41724-19-0), veloutone (2,2,5-trimethyl-5-pentylcyclopentan-1-one), 2,4,4,7-tetramethyloct-6-en-3-one and tetrameran (6,10-dimethylundecen-2-one).

In some embodiments, the fragrance can be, for example, 10-undecen-1-ol, 2,6-dimethylheptan-2-ol, 2-methylbutanol, 2-methylpentanol, 2-henoxyethanol, 2-phenylpropanol, 2-tert-butylcyclohexanol, 3,5,5-trimethylcyclohexanol, 3-hexanol, 3-methyl-5-phenylpentanol, 3-octanol, 3-phenylpropanol, 4-heptenol, 4-isopropylcyclohexanol, 4-tert-butylcyclohexanol, 6,8-dimethyl-2-nonanol, 6-nonen-1-ol, 9-decen-1-ol, α-methylbenzyl alcohol, α-terpineol, amyl salicylate, benzyl alcohol, benzyl salicylate, ß-terpineol, butyl salicylate, citronellol, cyclohexyl salicylate, decanol, dihydromyrcenol, dimethyl benzyl carbinol, dimethyl heptanol, dimethyl octanol, ethyl salicylate, ethyl vanillin, eugenol, farnesol, geraniol, heptanol, hexyl salicylate, isoborneol, isoeugenol, isopulegol, linalool, menthol, myrtenol, n-hexanol, nerol, nonanol, octanol, p-menthan-7-ol, phenylethyl alcohol, phenol, phenyl salicylat, tetrahydrogeraniol, tetrahydrolinalool, thymol, trans-2-cis-6-nonadicnol, trans-2-nonen-1-ol, trans-2-octenol, undecanol, vanillin, champiniol, hexenol and cinnamyl alcohol.

In some embodiments, the fragrance can be, for example, for example, benzyl acetate, phenoxyethyl isobutyrate, p-tert-butylcyclohexyl acetate, linalyl acetate, dimethyl benzyl carbinyl acetate (DMBCA), phenyl ethyl acetate, benzyl acetate, ethylmethylphenyl glycinate, allyl cyclohexyl propionate, styralyl propionate, benzyl salicylate, cyclohexyl salicylate, floramat, melusat and jasmacyclat.

In one embodiment, the fragrance can be, for example, for example, benzyl ethyl ether and ambroxan. The hydrocarbons include mainly terpenes, such as limonene and pinene.

In some embodiments, the fragrance is, for example, a musky scent, a pungent scent, a camphoraceous scent, an ethereal scent, a floral scent, a fruity scent, a peppermint scent, an aromatic scent, a gourmand scent, or any combination thereof.

In some embodiments, the fragrance can be mixtures of various fragrances, which can be referred to as a perfume or perfume oil. Perfume oils of this kind may also contain natural fragrance mixtures, as are obtainable from plant sources.

In some embodiments, the fragrance can be a fragrance precursor. "Fragrance precursor" refers to compounds which only release the actual fragrance following chemical conversion/separation, for example, when exposed to light or other environmental conditions, such as pH, temperature, etc. Treatment agents of this kind are often referred to as pro-fragrances.

Other fragrances known in the art, or any fragrance commercially available from a fragrance supplier (e.g., Firmenich, Givaudan, IFF, Symrise, Agilex, The Good Scents Company, Atlanta, Ga.).

Other fragrances and/or perfumes useful in the practice of the invention include the fragrances commonly used in the household and industrial cleaning and sanitizing industry.

As those of skill will appreciate, fragrances typically comprise highly concentrated solid ingredients. The presence of a non-hygroscopic solvent may be necessary to dissolve, disperse or mix these solid ingredients to make the fragrance homogenous throughout the solid cleaning head. Since fragrance manufacturers often incorporate solvents directly into their fragrances, coordinating solvent selection with the fragrance manufacturer may be necessary.

In some embodiments, the fragrance is, for example, present in in an amount of about 0.5 wt. %, about 1.0 wt. %, about 1.5 wt. %, about 2.0 wt. %, about 3.0 wt. %, about 4.0 wt. %, or about 5.0 wt. % based on total weight of the unit dose composition. In some embodiments, the fragrance is, for example, present in an amount from about 0.1 wt. % to about 5 wt. %, from about 0.5 wt. % to about 4.5 wt. %, about 0.5 wt. % to about 4 wt. %, from about 1.0 wt. % to about 4 wt. %, or from about 1.5 wt. % to about 4 wt. % by weight based on total weight of the unit dose composition.

Disintegrant

Disintegrants can be added to aid the breakdown of the puck. Preferred disintegrants include corn starch, Polyvinylpyrillidone (PVP) cross-linked, PVP (not cross-linked) and microcrystalline cellulose (MCC).

Lubricant

A lubricant may be used in the cleaning compositions. The lubricant should combine hydrophobic and hydrophilic properties in order to achieve both good lubrication and a short disintegration time. Surfactants such as sodium lauryl sulfate, fumaric acid, magnesium stearate and magnesium lauryl sulfate can be used. The lubricant may also be selected from wheat germ oil, canola oil, safflower oil, sunflower seed oil, sesame oil, cotton seed oil, corn oil, palm oil, coconut oil, flax seed oil, olive oil, mineral oil, PEG 200, PEG 300, PEG 400, and combinations thereof.

A lubricant can also be added when compressing the composition. For example, optionally prior to introduction of a preform into a die, one or more of the interior surfaces of the mold may be sprayed with a mold release material or other lubricant such as mineral oil or a paraffin oil.

The lubricant may be included up to 5% by weight of the unit dose composition, preferably less than about 1% by weight, more preferably about 0.5% by weight or less of the composition.

Glidant

A glidant may be included in the composition to promote the flow properties of tablet granules or powder materials.

Examples of glidants that may be used include colloidal silicon dioxide, talc, tribasic calcium phosphate, hydrophobic colloidal silica, hydrophobic fumed silica, cellulose, magnesium oxide, sodium stearate, magnesium silicate, and magnesium trisilicate.

When included, the glidant is typically present at less than 5% by weight of the unit dose composition, more preferably about 2% by weight or less, most preferably less than 1% by weight.

Method of Preparation

The unit dose compositions described herein can be manufactured by various compression methods including direct compression, or wet granulation and/or dry granulation followed by compression.

In one embodiment, the method of manufacture may comprise grinding all powder materials to a fine particle size using a mortar and pestle or by passing through a sieve, melting ingredients, such as nonionic surfactant, to around 80° C. and combining all the materials until uniform. The resulting mixture is then pressed into tablets. It may be preferable to add all or a portion of any lubricant and/or fragrance to a premix of the other ingredients.

In another embodiment, powder ingredients can be combined in a v-blender or with a mixer and directly compressed into a tablet. It may be preferable to add all or a portion of the lubricant and/or fragrance to a premix of the other ingredients.

In yet another embodiment, an acid premix and a basic premix may be prepared and sieved or ground to a fine particle size. The two mixtures can each be dry granulated. The granules are blended together with any extragranular glidant and/or lubricant. The final mixture is compressed into tablets.

Typically, the unit dose is manufactured by compression on a conventional tablet press using round or oval convex or flat face tooling, or a combination of convex and flat face. Convex tooling containing ridges may be preferable to increase surface area of the compositions exposed to toilet water and increase dissolution.

In certain preferred embodiments, the tooling is designed such that the compressed solid contains socket 36 in at least one of its surfaces that can be adapted to receive a wand 50. The depth of the socket $Y_c$-$Y_d$ can be less than the height $Y_a$-$Y_b$ or can be the same as height $Y_a$-$Y_b$. In one embodiment, as shown in FIGS. 1 and 2, the compressed solid can comprise an annular shape with a cylindrical socket 36 in its center that extends either partially or entirely through the height of the compressed solid, whereby the compressed solid can be mounted on a pin extending from wand 50.

The depth of the indentation may be anywhere from 25% to 100% of the height of the compressed solid.

Weights of tablets: the tablets will typically weigh about 1 to about 70 grams, more preferably about 10 to about 50 grams, most preferably 20 to about 45 grams.

Hardness: A tablet strength above 15 N is acceptable, more preferably the tablet hardness is over 20 N, most preferably over 50 N.

Figure 4:
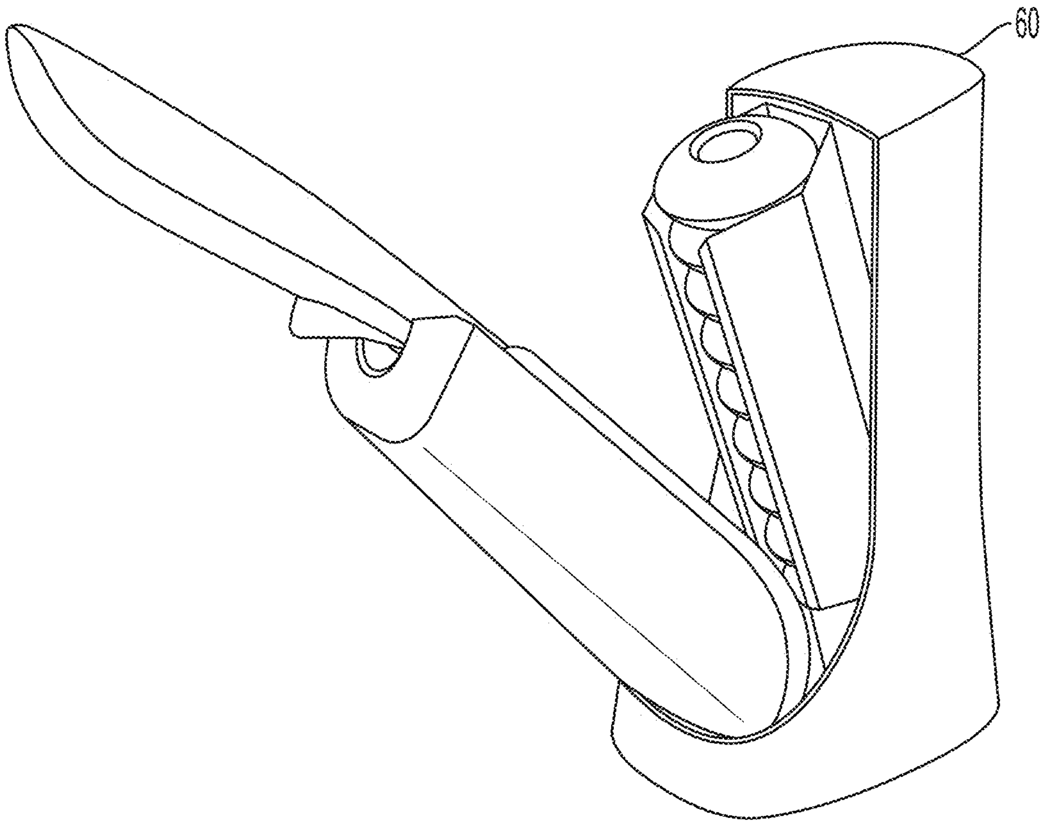
FIG. 4 shows an exemplary caddy system that can hold a wand and a plurality of the tablets described herein.

A plurality of tablets 30 may be packaged together. As shown in FIG. 4, a plurality of tablets may be stored in a caddy 60 with wand 50.

Methods of Use

To use the cleaning compositions to clean a surface, the composition is compressed e.g., into a tablet and the compressed unit is exposed to a solvent, typically water, which is capable of dissolving the water-soluble filler and surfactant. The cleaning composition may be submerged in water from a toilet, sink, or bathtub depending on the surface being cleaned. Preferably, the cleaning composition is attached to a wand which can assist in submerging the tablet and rubbing it against the surface of a toilet bowl.

The tablet can be partially dipped or submerged in the solvent (water) one or more times. Upon contact with the solvent, the water-soluble dye and any water-soluble filler begins to dissolve. The surfactant provides the detergent for cleaning the surface. Any abrasive particles are also released onto the surface to be cleaned and provide the abrasive material for scouring the surface. The surfactant will foam when exposed to the solvent. The foam helps to suspend the released abrasive particle for prolonged use in scouring the surface.

The release of the abrasive particles assists in scouring the surface. However, because the abrasive particles are not rigidly adhered to any component, the abrasive particles are allowed to roll during cleaning, which prevents excessive scratching and damage to the surface.

The water-soluble dye will color the solvent and release onto the surfaces that come into contact with the composition. Upon continual exposure to the solvent, a majority of the water-soluble dye and filler is dissolved, and therefore a majority of abrasive particles are exposed to the surface. The wand is used to manually rub the tablet along a toilet surface further adding to the abrasive action of the composition. Water-soluble dye may further release as the tablet contacts surfaces that are wet with solvent.

Upon completion of the cleaning, the user may flush the composition down the toilet. Preferably, the tablet is released from the wand prior to fully dissolving and flushing.

EXAMPLES

Example 1

The compositions Table 1 were combined into a direct compression mixture and compressed into tablets. The anionic surfactant was C14/16-alpha olefin sulphonate sodium salt (AOS). The water-soluble blue dye was a triphenylmethane with Acid Blue 9 color index no. 42090. All ingredients except fragrance were combined in a KITCHENAID 4.5 quart tilt-head stand mixer and mixed for 15 minutes. The fragrance was added and the blend was mixed for an additional 10 minutes. Tablets having weight of about 35 g were prepared with round tooling having a tapered center hole (61 mm diameter×14 mm height with a top hole of 22 mm in diameter and bottom hole of 30 mm in diameter) using a Carver Press (model 3851-0) at 7.5 MT force. The compressed tablets had a hardness of about 56 N.

TABLE 1

| Ingredient/Comp. | C1 | C2 | I1 |
|---|---|---|---|
| Citric Acid | 45.37 | 45.37 | 45.35 |
| Anionic Surfactant | 22.50 | 22.50 | 22.50 |
| Sodium Bicarbonate | 29.00 | 29.00 | 29.00 |
| Precipitated Calcium Silicate | 1.00 | 1.00 | 1.00 |
| Water-Soluble Anionic Dye | 0.03 | 0.00 | 0.03 |
| Colorant (C.I. Pigment Blue) | 0.00 | 0.03 | 0.03 |
| Fragrance | 2.10 | 2.10 | 2.10 |

Figure 5A:
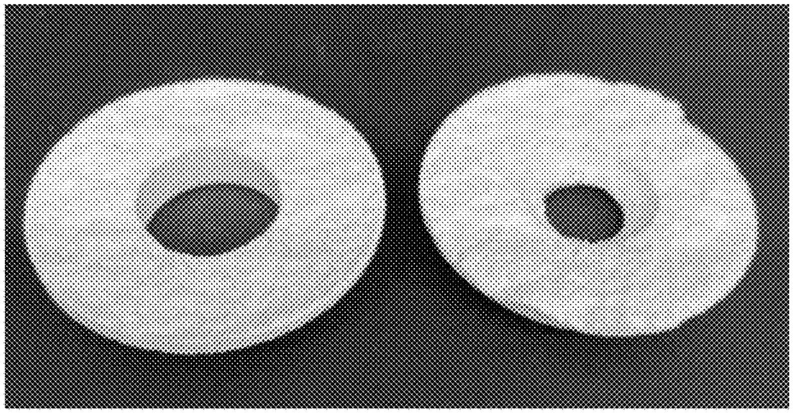
FIGS. 5A and 5B are a color photographs showing cross sections of a tablet having composition C1 of Example 1.
Figure 5B:
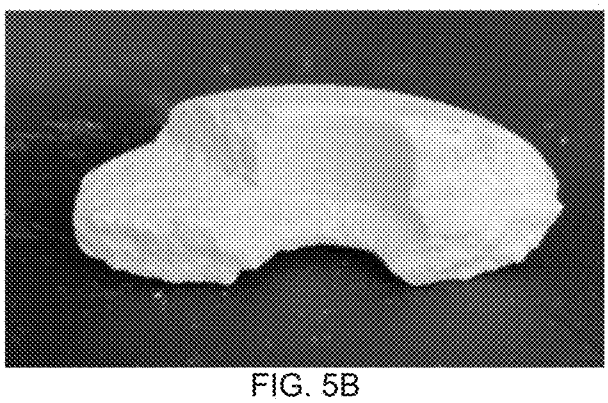

FIGS. 5A and 5B showing a cross sections of a tablet having composition C1. The tablet maintains a white color on the outside and inside of the tablet. When the tablet was placed in water, the water turned blue.

Figure 6:
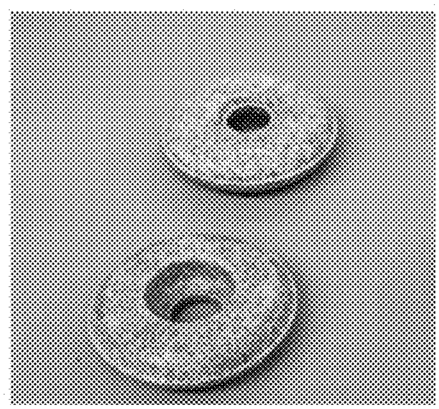
FIG. 6 is a color photograph showing various tablets having composition C2 of Example 1.

FIG. 6 is a color photograph showing various tablets having composition C2. The tablets appear blue but did not turn water blue or colored when placed in water.

Example 2

The composition of Table 2 was combined into a direct compression mixture and compressed into tablets. The anionic surfactant was C14/16-alpha olefin sulphonate sodium salt (AOS). The water-soluble blue dye was a triphenylmethane with Acid Blue 9 color index no. 42090. All ingredients except fragrance were combined in a KITCHENAID 4.5 quart tilt-head stand mixer and mixed for 15 minutes. The fragrance was added and the blend was mixed for an additional 10 minutes. Tablets having weight of about 25 g were prepared with round tooling having a tapered center hole using a Carver Press (model 3851-0) at 7.5 MT force.

Dissolution of the tablets was measured in 3 liters of 70° F. water without agitation. The tablets were placed in the water for 10 minutes and then left to dry for 24 hours and re-weighed. The percent dissolution was calculated as (original weight−post-test weight)/original weight.

Tablet strength was measured by placing the tablet vertically on a Tinius Olsen instrument.

TABLE 2

| Ingredient/Comp. | I2 |
|---|---|
| Citric Acid | 45.37 |
| Anionic Surfactant | 22.50 |
| Sodium Bicarbonate | 29.00 |
| Precipitated Calcium Silicate | 1.00 |
| Water-Soluble Anionic Dye | 0.03 |
| Colorant (C.I. Pigment Blue) | 0.00 |
| Fragrance | 2.10 |
| Dissolution (%) | 46.6 |
| Hardness (N) | 54 |

I2 produced a white tablet that colored the water blue when the tablet was placed in water for dissolution testing or in toilet water.

Example 3

Alternative compositions shown in TABLE 3 were combined into a direct compression mixture and compressed into tablets. The anionic surfactant was C14/16-alpha olefin sulphonate sodium salt. The Acid Blue 9 was a triphenylmethane with color index no. 42090. All ingredients except fragrance were combined in a KITCHENAID 4.5 quart tilt-head stand mixer and mixed for 15 minutes. The fragrance was added and the blend was mixed for an additional 10 minutes. Tablets were prepared using a Carver Press (model 3851-0) at 7.5 MT force.

Dissolution of the tablets was measured in 3 liters of 70° F. water without agitation. The tablets were placed in the water for 10 minutes and then left to dry for 24 hours and re-weighed. The percent dissolution was calculated as (original weight−post-test weight)/original weight.

Tablet strength was measured by placing the tablet vertically on a Tinius Olsen instrument.

TABLE 3

| Ingredient/Comp. | C3 | I3 | I4 |
|---|---|---|---|
| Citric Acid | 26.02 | 42.93 | 44.75-35.61 |
| Anionic Surfactant | 14.00 | 21.03 | 14.00 |
| Sodium Bicarbonate | 47.85 | 5.46 | 28.61-22.76 |
| Ground Soap | 0.00 | 15.00 | 0.00 |
| Precipitated Calcium Silicate | 0.00 | 0.50 | 0.50 |
| PEG-8000 | 10.00 | 0.00 | 10.00-25.00 |
| Sodium Chloride | 0.00 | 3.00 | 0.00 |
| Corn Starch | 0.00 | 3.00 | 0.00 |
| Acid Blue 9 | 0.03 | 0.01 | 0.03 |
| Fragrance | 2.10 | 2.10 | 2.10 |
| Dissolution % at 10 min. no agitation | 78.5 | 11 | 63-73 |
| Hardness (N) | 78 | 29 | 92-124 |

All tablets provided a strong blue color when placed in water. 13 and 14 compositions produced white tablets that turned the water blue during dissolution testing. In contrast, the C3 tablets having no precipitated calcium silicate desiccant appeared blue prior to being placed in water for dissolution testing. It was determined that inclusion of the precipitated Calcium Silicate desiccant in 13 and 14 compositions prevented the Acid Blue 9 dye from solubilizing during manufacture and storage of the tablets.

It will be appreciated that, within the principles described by this specification, a vast number of variations exist. It should also be appreciated that the embodiments described are only embodiments, and are not intended to limit the scope, applicability, or construction of the claims in any way.

What is claimed is:

1. A dissolvable solid unit dose toilet cleaning composition comprising:
- an anionic surfactant;
- a carbonate or bicarbonate salt;
- an organic acid;
- a dye system comprising a desiccant and a water-soluble dye; and
- virgin soap pellets comprising at least one monovalent salt of a monocarboxylic fatty acid in an amount of from 5 wt % to 50 wt %, based on the total weight of the unit dose toilet cleaning composition,
- wherein at least 30% of the total weight of the unit dose toilet cleaning composition dissolves when submerged in water for 10 minutes.

2. The unit dose toilet cleaning composition of claim 1, wherein the desiccant is in an amount of from about 0.2% to about 3.0% by weight, based on the total weight of the unit dose toilet cleaning composition.

3. The unit dose toilet cleaning composition of claim 1, wherein the water-soluble dye is in an amount of from about 0.005% to about 0.1% by weight, based on the total weight of the unit dose toilet cleaning composition.

4. The unit dose toilet cleaning composition of claim 1, wherein the dye system further comprises a colorant.

5. The unit dose toilet cleaning composition of claim 4, wherein the colorant is a lake pigment.

6. The unit dose toilet cleaning composition of claim 4, wherein the colorant is in an amount of from 0.0001% to about 0.1% by weight, based on the total weight of the unit dose toilet cleaning composition.

7. The unit dose toilet cleaning composition of claim 1, wherein the unit dose toilet cleaning composition is a compressed solid, defines an indentation in at least one of its surfaces, and the indentation is adapted to receive and engage a wand.

8. A unit dose toilet cleaning composition comprising:
- an anionic surfactant;
- a carbonate or bicarbonate salt;
- an organic acid;
- about 0.2% to about 3.0% calcium silicate;
- a water-soluble dye; and
- virgin soap pellets comprising at least one monovalent salt of a monocarboxylic fatty acid in an amount of from 5 wt % to 50 wt %, based on the total weight of the unit dose toilet cleaning composition.

9. The unit dose toilet cleaning composition of claim 8, wherein the calcium silicate is in an amount of from about 0.5% to about 1.0% by weight, based on the total weight of the unit dose toilet cleaning composition.

10. The unit dose toilet cleaning composition of claim 8, wherein the water-soluble dye comprises a colorant.

11. The unit dose toilet cleaning composition of claim 8, wherein the anionic surfactant is an alpha olefin sulphonate.

12. A method of visually indicating application of a toilet cleaning composition to a toilet, the method comprising:
- providing a unit dose toilet cleaning composition comprising:
- an anionic surfactant;
- a carbonate or bicarbonate salt;
- an organic acid;
- a dye system comprising a desiccant and a water-soluble dye; and
- virgin soap pellets comprising at least one monovalent salt of a monocarboxylic fatty acid in an amount of from 5 wt % to 50 wt %, based on the total weight of the unit dose toilet cleaning composition, wherein at least 30% of the total weight of the unit dose toilet cleaning composition dissolves within 10 minutes when submerged in toilet water; and exposing a surface of the unit dose toilet cleaning composition to water in the toilet, wherein the water-soluble dye colors the water in the toilet.

13. The method of claim 12, further comprising pressing the wetted surface of the unit dose toilet cleaning composition to a surface of the toilet, wherein the water-soluble dye colors the surface of the toilet.

14. The method of claim 12, wherein the step of exposing comprises submerging the unit dose toilet cleaning composition in the water in the toilet.

15. The method of claim 12, wherein the desiccant is in an amount of from about 0.2% to about 3.0% by weight, based on the total weight of the unit dose toilet cleaning composition.

16. The method of claim 12, wherein the unit dose toilet cleaning composition is free from color of the water-soluble dye upon storage at room temperature.

17. The unit dose toilet cleaning composition of claim 1, wherein the virgin soap pellets further comprises at least one of:

a water soluble polyhydric organic solvent;

a sugar alcohol;

an organic salt;

an inorganic salt;

a chelating agent; or a stabilizer.

18. The unit dose toilet cleaning composition of claim 1, wherein the virgin soap pellets comprise fatty acids in an amount of from about 0.5% to 5% by weight, based on the total weight of the virgin soap pellets.

19. The unit dose toilet cleaning composition of claim 8, wherein the virgin soap pellets further comprise at least one of:

a water soluble polyhydric organic solvent;

a sugar alcohol;

an organic salt;

an inorganic salt;

a chelating agent; or a stabilizer.

20. The unit dose toilet cleaning composition of claim 8, wherein the virgin soap pellets comprise fatty acids in an amount of from about 0.5% to 5% by weight, based on the total weight of the virgin soap pellets.

* * * * *